Dec. 20, 1932. G. L. R. J. MESSIER 1,891,681
FRAMEWORK FOR THE WINGS OF AEROPLANES AND FOR OTHER OBJECTS
Filed July 7, 1932
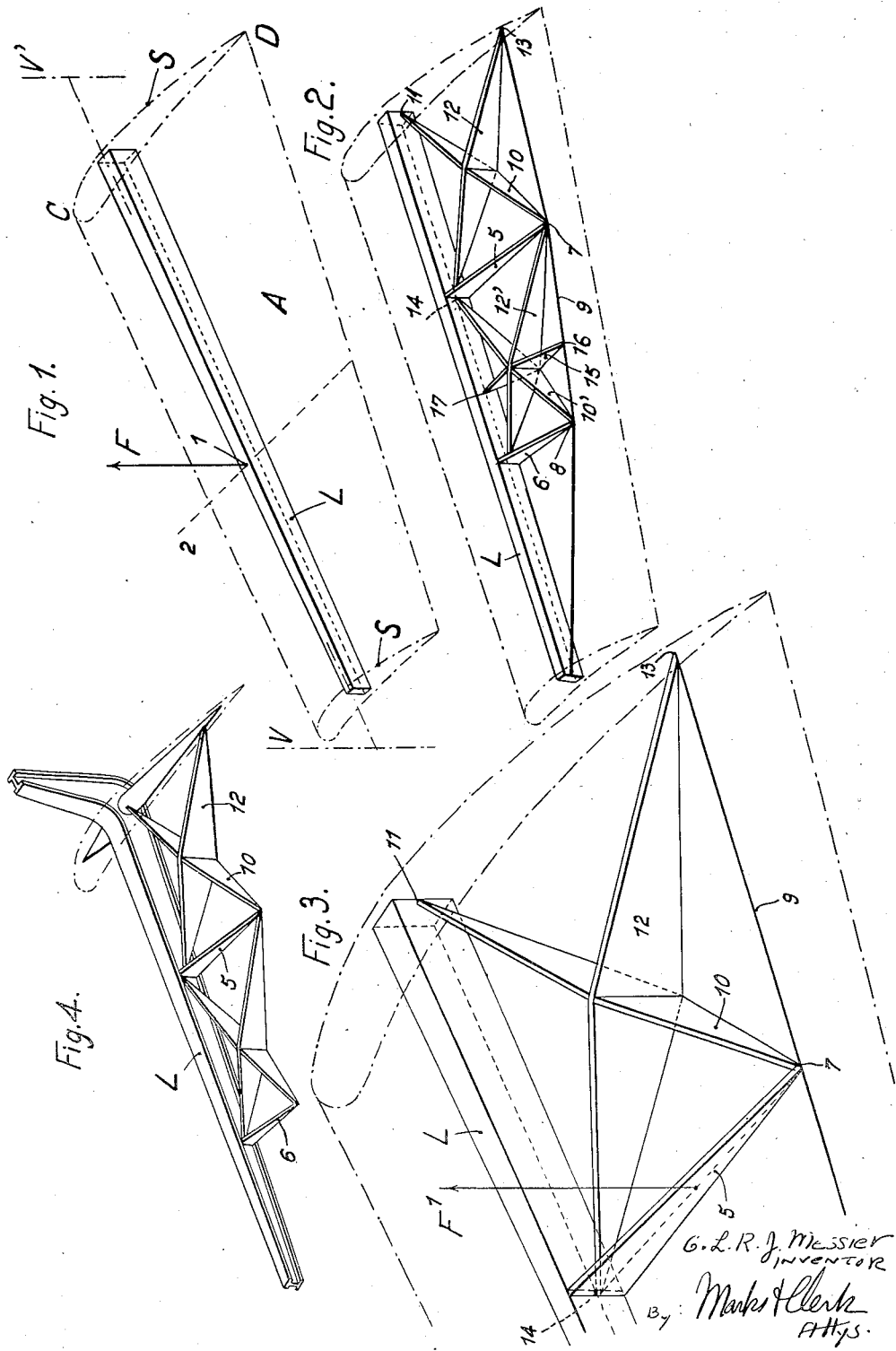

Patented Dec. 20, 1932

1,891,681

UNITED STATES PATENT OFFICE

GEORGE LOUIS RENÉ JEAN MESSIER, OF MONTROUGE, FRANCE

FRAMEWORK FOR THE WINGS OF AEROPLANES AND FOR OTHER OBJECTS

Application filed July 7, 1932, Serial No. 621,272, and in France October 29, 1931.

The present invention has for its object an improved system of construction of framework for the wing of an aeroplane, more particularly intended for high speed machines and for other objects.

For these aeroplanes, in fact there is a tendency to employ thin wings, and due to the inability to fix in these wings sufficiently resisting frameworks manufacturers have had recourse to struts or bracing wires in order to support them at one or several points of the span.

Fig. 1 is a diagrammatic representation of an airplane wing, to illustrate the various forces acting thereon;

Fig. 2 is a perspective view of the system of framework embodying my invention;

Fig. 3 is an enlarged view of a portion of such framework at the junction of the wing with the fuselage, and Fig. 4 is a perspective view of a modification.

If, in a wing having a profile of slight thickness as represented diagrammatically in Fig. 1 of the accompanying drawing, the centre of the thrust 1 was fixed, whatever the incidence, and remained in a vertical plane V—V' containing the maximum thickness of the different sections S, of the wing A, it would be possible to use a single spar L, situated in the thickest part of the wing.

Calculation shows, in fact, that it would be possible to give this spar sufficient resistance to resist in flexion the force F, resulting from the thrust exercised by the air upon the wing let into the fuselage at the section C, D.

Practically the centre of thrust 1, is not immovable, so that in certain cases, the single spar would work in torsion, which would deform it and would rapidly cause its breakage.

For those types of machines in which the thickness of the wing only allows the use of a single spar a construction of framework must be sought such that the centre of thrust can be moved upon the line 2—3 (Fig. 1) without inconvenience, that is to say without exposing the spar to torsional effects.

The system of framework forming the object of the invention and of which Figs. 2 to 4 are diagrammatic perspective views, satisfies this condition.

This framework is characterized in that, to the spar are rigidly connected one or several arms the ends of which are united by a system of triangulation which is opposed to their vertical movement.

For that purpose:

(a) The said ends of the arms are connected by rigid or non-rigid parts upon which bear the ribs of the framework of the wing.

(b) To the summits of the quadrilaterals thus delimited are connected X-shaped parts, the first of these parts being by two of its summits connected to the fuselage of the machine.

As seen in Fig. 2 the spar L carries arms 5—6 which are connected rigidly to it. The ends 7—8 of these arms (the number of which is variable according to the type of wing) are connected by parts 9 upon which bear the ribs of the wing (not shown).

The spar L is thus relieved of all torsional fatigue and, on the other hand, there is no tendency for it to bend under the action of flexional stresses in its plane.

The system of triangulation shown in Fig. 3 to a larger scale, comprises, on the side of the fuselage, a part 10 preferably having the form of a lozenge, one end of which is connected to the end 7 of the adjacent arm 5, whilst the other end is fixed at 11 to the fuselage of the aeroplane or to the inner end of the wing.

At its greatest height, the part 10 is rigidly fixed to a second part 12, likewise in the form of a lozenge, which connects a point 13 of the fuselage to a point 14 of the spar, for example to the junction of the latter with the arm 5.

The X-shaped part thus formed is connected at its four summits 7—13—11—14.

It is easy to show that any vertical force $F^1$ applied in the plane of the first arm 5, can be resolved into a force applied in the vertical plane of the lozenge at 14, and into forces applied to the points 11 and 13 of the fuselage.

A similar system of triangulation 10'—12' and the like is mounted in each of the spaces between the successive arms 5—6 and the like over the whole span.

The vertical forces which are applied in the planes of the arms can therefore exercise no torsional stress upon the spar, because from place to place, that is to say from one summit 8 to the preceding summit 7 they are all reducible into forces being exerted at 13, at 11 or in the vertical plane of the spar.

With respect to the vertical forces acting upon the ribs between the arms 5—6 and the like, they can produce in the spar torsional stresses if the connecting parts 9 are not rigid. These stresses besides only take place in the delimited sections between the arms 5—6 and the like and cannot therefore be harmful. It is nevertheless preferable to cause the ribs to bear equally upon rigid parts 9, which work then in flexion upon short lengths.

In order to diminish the importance of these parts 9, they can bear at a point 16 in their length, upon lozenge shaped parts 15, the central part of which is connected to the centre of the parts 10'—12', the other end of these parts 15 being connected at 17 to the spar.

It will be noticed that the X-shaped parts act to support the spar and, if they are calculated for this purpose, they resist the dragging stresses in the plane of the wing.

The same system of triangulation can, if necessary, be mounted in front of the spar instead of being arranged in the rear, as in the example shown in the drawing.

It is possible also to conceive a double system of triangulation in front and in rear of the spar.

The framework of a wing of an aeroplane which has been described may be combined with a connecting system between the two parts of a spar cut at the centre of the span for the passage of the fuselage, for example with the system of connection which forms the object of an application for French patent by the same applicant and dated February 16, 1931 for improvements in the construction of aeroplanes.

Fig. 4 represents, by way of indication, such a construction.

The lozenge forms indicated for the triangulation parts are naturally not limitative.

The mode of construction above described may be applied, outside aviation, to all other constructions and frameworks which ought to comply with conditions comparable to those which have been defined in the preamble.

What I claim is:

1. In an airplane including wings and a rigid structure to which said wings are attached, a wing framework which comprises in combination, a single spar rigidly secured to said structure, a plurality of arms rigidly secured to said spar transversally thereto, a plurality of ribs carried by said spar, a plurality of elements extending between said arms for supporting said ribs, and a truss consisting of diagonal crossed members each rigidly interconnecting two adjacent arms, the two members at the end of said truss being rigidly secured to said rigid structure of the airplane.

2. In an aeroplane including wings and a rigid structure to which said wings are attached, a wing framework which comprises in combination, a single spar rigidly secured to said structure, a plurality of arms rigidly secured to said spar transversally thereto, a plurality of ribs carried by said spar, a plurality of elements extending between corresponding ends of said arms for supporting the ends of said ribs, and a plurality of adjacent rigid X-shaped members having their branches diagonally disposed between said spar and said elements so as to rigidly interconnect opposite ends of two adjacent arms, the X-shaped member that is adjacent to said rigid structure of the aeroplane having its two branches rigidly secured to said structure.

3. In an aeroplane including wings and a fuselage to which said wings are attached, a wing framework which comprises in combination, a single spar rigidly secured to said fuselage, a plurality of arms extending in a fore and aft direction rigidly secured to said spar, a plurality of ribs carried by said spar, a plurality of elements for supporting the ends of said ribs extending between corresponding ends of said arms, and a plurality of adjacent X-shaped members each consisting of two lozenge-shaped branches placed edgewise and disposed between said spar and said elements so that each branch connects the front end of one arm to the rear end of the adjacent arm, the X-shaped member that is adjacent to said fuselage having its two branches rigidly secured to said fuselage.

4. In an aeroplane including wings and a fuselage to which said wings are attached, a wing framework which comprises in combination, a single spar rigidly secured to said fuselage, a plurality of arms rigidly secured to the rear side of said spar substantially at right angles thereto, a plurality of ribs carried by said spar, a plurality of flexible elements for supporting the ends of said ribs extending between the rear ends of said arms, and a plurality of adjacent X-shaped members each consisting of two lozenge-shaped branches placed edgewise and disposed between said spar and said elements so that each branch connects the front end of one arm with the rear end of the adjacent arm, the X-shaped member that is adjacent to the fuselage having its two branches rigidly secured thereto.

5. In an aeroplane including wings and a fuselage to which said wings are attached, a wing framework which comprises in combination, a single spar rigidly secured to said fuselage, a plurality of arms extending in a direction substantially at right angles to said spar and rigidly secured thereto, a plurality of ribs carried by said spar, a plurality of elements rigidly interconnecting the free ends of said arms adapted to support the ends of said ribs, and a plurality of adjacent X-shaped members each consisting of two lozenge-shaped branches placed edgewise and disposed between said spar and said rigid elements so that each branch connects the front end of one arm to the rear end of the adjacent arm, the X-shaped member that is adjacent to the fuselage having its two branches rigidly secured to said fuselage.

6. A wing framework according to claim 3 in which there is further provided a member extending in a substantially fore and aft direction on either side of the point at which two branches of an X-shaped member meet each other and rigidly secured to said spar and to said element.

7. A wing framework according to claim 5 further comprising a lozenge-shaped member disposed edgewise and rigidly connecting the central part of said branches of an X-shaped member to the spar and another lozenge-shaped member also disposed edgewise and rigidly connecting the central part of the branches of an X-shaped member to the corresponding rigid element, said two members extending in a direction substantially parallel to that of said arms.

The foregoing specification of my: "improved framework for the wings of aeroplanes and for other objects", signed by me this 28th day of June, 1932.

GEORGE LOUIS RENÉ JEAN MESSIER.